(12) United States Patent
Wu (10) Patent No.: US 12,481,718 B2
(45) Date of Patent: Nov. 25, 2025

(54) HARDWARE ACCELERATION OF AFFINE TRANSFORMATIONS

(71) Applicant: XILINX, INC., San Jose, CA (US)

(72) Inventor: Ephrem Wu, San Mateo, CA (US)

(73) Assignee: XILINX, INC., San Jose, CA (US)

(*) Notice: Subject to any disclaimer, the term of this patent is extended or adjusted under 35 U.S.C. 154(b) by 1112 days.

(21) Appl. No.: 17/472,347

(22) Filed: Sep. 10, 2021

(65) Prior Publication Data

US 2023/0077616 A1 Mar. 16, 2023

(51) Int. Cl.
*G06F 17/16* (2006.01)
*G06F 7/57* (2006.01)

(52) U.S. Cl.
CPC .............. *G06F 17/16* (2013.01); *G06F 7/57* (2013.01)

(58) Field of Classification Search
CPC ........... G06F 17/16; G06F 7/57; G06F 12/126
See application file for complete search history.

(56) References Cited

U.S. PATENT DOCUMENTS 8,924,455 B1   12/2014  Barman et al.
10,354,733 B1   7/2019  Zejda et al.
2018/0074824 A1* 3/2018  Sazegari ............ G06F 9/30101
2020/0133993 A1* 4/2020  Aga .................... G06F 15/8007
2021/0224069 A1* 7/2021  Chen .................... G06F 9/3001

OTHER PUBLICATIONS

Wikipedia, "Affine transformation", Jul. 16, 2021. (Year: 2021).*
"The Authoritative Dictionary of IEEE Standards Terms, Seventh Edition," in IEEE Std 100-2000 , vol. No., pp. 1-1362, Dec. 11, 2000 , doi: 10.1109/IEEESTD.2000.322230. (Year: 2000).*
Dave. N., et. al., "Hardware Acceleration of Matrix Multiplication on a Xilinx FPGA," 2007 5th IEEE/ACM International Conference on Formal Methods and Models for Codesign (MEMOCODE 2007), 2007, pp. 97-100.
Bagni, Daniele, et al., "A Zynq accelerator for floating-point matrix multiplication designed with Vivado HLS," Silinx Application Note, Zynq-7000 AP SoC(XAPP1170 (v2.0)), Jan. 2016.

* cited by examiner

*Primary Examiner* — Andrew Caldwell
*Assistant Examiner* — Jonathan David Warner
(74) *Attorney, Agent, or Firm* — Patterson + Sheridan, LLP (57) ABSTRACT

Examples herein describe a hardware accelerator for affine transformations (matrix multiplications followed by additions) using an outer products process. In general, the hardware accelerator reduces memory bandwidth by computing matrix multiplications as a sum of outer products. Moreover, the sum of outer products benefits parallel hardware that accelerates matrix multiplication, and is compatible with both scalar and block affine transformations, and more generally, both scalar and block matrix multiplications.

19 Claims, 11 Drawing Sheets

$B_{33}$ $B_{32}$ $B_{31}$
$B_{23}$ $B_{22}$ $B_{21}$
$B_{13}$ $B_{12}$ $B_{11}$ $A_{13}$ $A_{23}$
$A_{12}$ $A_{22}$
$A_{11}$ $A_{21}$ $R_{13}[1]$ (hatched)
$R_{12}[1]$ $R_{22}[1]$
$R_{11}[1]$ $R_{21}[1]$ $R_{23}[1] = A_{21}B_{13} + R_{23}[0]$

⑪

$B_{33}$ $B_{32}$ $B_{31}$
$B_{23}$ $B_{22}$ $B_{21}$
$B_{13}$ $B_{12}$ $B_{11}$ $A_{13}$ $A_{23}$
$A_{12}$ $A_{22}$
$A_{11}$ $A_{21}$ $R_{13}[1]$ $R_{23}[0]$
$R_{12}[1]$ (hatched)
$R_{11}[1]$ $R_{21}[1]$ $R_{22}[1] = A_{21}B_{12} + R_{22}[0]$

⑩

$B_{33}$ $B_{32}$ $B_{31}$
$B_{23}$ $B_{22}$ $B_{21}$
$B_{13}$ $B_{12}$ $B_{11}$ $A_{13}$ $A_{23}$
$A_{12}$ $A_{22}$
$A_{11}$ $A_{21}$ $R_{13}[1]$ $R_{23}[0]$
$R_{12}[1]$ $R_{22}[0]$
$R_{11}[1]$ (hatched)

HARDWARE ACCELERATION OF AFFINE TRANSFORMATIONS

TECHNICAL FIELD

Examples of the present disclosure generally relate to performing affine transformations using outer products of matrix multiplication.

BACKGROUND

Matrix multiplication is one of the most common operations of machine learning and scientific computing. While hardware vendors tout peak throughput (often in units of TOP/s, or tera operations per second), these applications are often bandwidth-bound as opposed to compute-bound. Data movement, therefore, can be more important than sheer compute.

Specifically, neural networks make heavy use of affine transformations. An affine transformation is a matrix multiplication followed by a matrix addition. Deep neural networks arrange activations as a network of layers. The matrix multiplication in each layer measures the similarity between two tensors, for instance, between the input activations and the weights learned from prior training, or between a query tensor and a key tensor obtained dynamically according to the context in attention networks. The matrix addition adjusts the matrix product to form pre-activations. A nonlinear operator then converts the pre-activations into output activations as the next layer of neurons. However, performing the matrix multiplications in the affine transformation using the traditional, inner products process can result in an application that becomes bandwidth-bound.

SUMMARY

Techniques for performing matrix multiplications are described. One example is an integrated circuit (IC) that includes a first memory configured to store block matrices where the block matrices are submatrices of two operand matrices, an arithmetic circuit comprising circuitry coupled, at an input, to the first memory where the arithmetic circuit is configured to perform a matrix multiplication of the two operand matrices by performing outer products using the block matrices, and a second memory coupled to an output of the arithmetic circuit where the second memory is configured to store partial matrices resulting from performing outer products and a final matrix resulting for summing the partial matrices.

One example described herein is an IC that includes a first memory configured to store portions of two operand matrices, an arithmetic circuit comprising circuitry coupled, at an input, to the first memory where the arithmetic circuit is configured to perform a matrix multiplication of the two operand matrices by performing outer products using the portions of the two operand matrices, and a second memory coupled to an output of the arithmetic circuit, the second memory is configured to store partial matrices resulting from performing outer products and a final matrix resulting for summing the partial matrices.

One example described herein is a method that includes loading at least portions of two matrices into a first memory to perform matrix multiplication, computing outer products of the two matrices to generate a plurality of partial matrices, storing the plurality of partial matrices in a second memory, and summing the partial matrices to generate a final matrix.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe a hardware accelerator for affine transformations (matrix multiplications followed by additions) using an outer products process. In general, the hardware accelerator reduces memory bandwidth by computing matrix multiplications as a sum of outer products. Moreover, the sum of outer products benefits parallel hardware that accelerates matrix multiplication, and is compatible with both scalar and block affine transformations.

While the embodiments herein use affine transformations as a specific example, performing outer products during a matrix multiplication can be done even if the resulting matrix is not then summed with another matrix as part of an affine transformation. Put differently, the embodiments herein can be used to perform a matrix multiplication outside of the context of performing an affine transformation.

Figure 1:
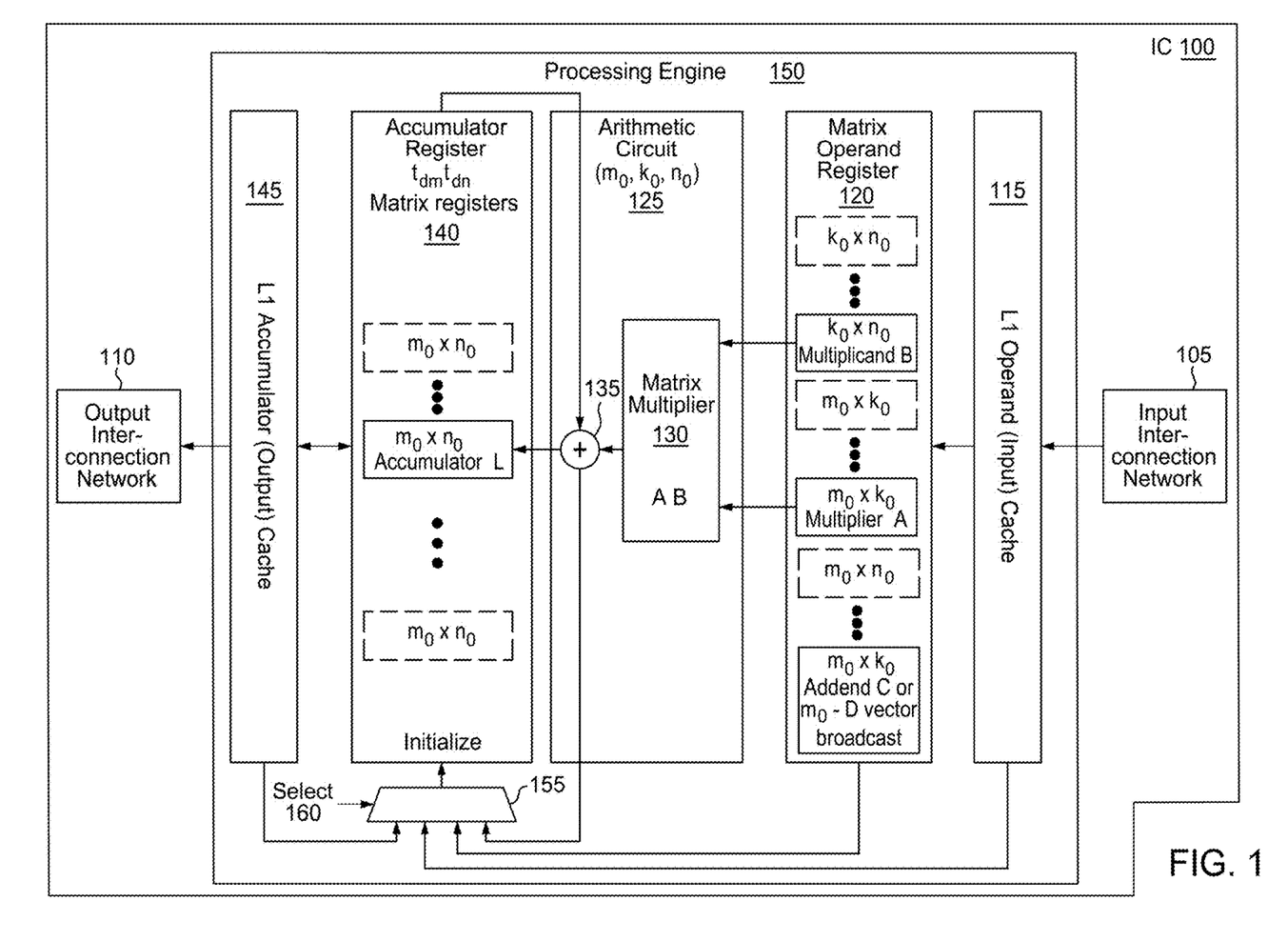
FIG. 1 is a block diagram of an integrated circuit with a processing engine accelerated for performing affine transformations, according to an example.

FIG. 1 is a block diagram of an integrated circuit (IC) 100 with a processing engine 150 accelerated for performing affine transformations, according to an example. In addition to the processing engine 150, the IC 100 includes an input interconnection network 105 and an output interconnection network 110 which permit the engine 150 to share data with other processing engines 150 in the IC 100 as well as different levels of memory (e.g., L2/L3 caches, external RAM, etc.).

The processing engine 150 includes L1 operand cache 115 (also referred to as input cache or memory) and L1 accumulator cache 145 (also referred to as output cache or memory). In typically memory hierarchies, caches do not have reserved portions. However, in this embodiment, the L1 operand cache 115 and accumulator cache 145 represent reserved portions of the total L1 cache. That is, portions of the L1 cache are reserved to store operand and accumulator data. While the caches 115, 145 are shown as two distinct memories, they may be different portions of the same physical memory element.

The operand cache 115 is coupled to matrix operand registers 120 (memories) which store the operands for performing matrix multiplication. The registers 120 are in turn coupled to an input of an arithmetic circuit 125 that has a matrix multiplier 130 for multiplying operands of two matrices (matrices A and B in this example). The matrix multiplier 130 performs an outer products process in order to multiply matrices A and B. The result of the matrix multiplication can then be summed with another matrix by an adder circuit 135 to complete the affine transformation. However, this matrix addition can be avoided when doing an accumulation operation (Z=AB+Z') since the arithmetic circuit 125 is able to perform Z=AB+Z' in one clock cycle. In that case, the processing engine 150 can be initialized using a multiplexer 155. As shown, the multiplexer 155 receives inputs from the L1 accumulator cache 145, the matrix operand register 120, the adder circuit 135, and the L1 operand cache 115. When doing an accumulation operation, the processing engine 150 can load the result of the previous affine transform (Z') into a accumulator registers 140 using the multiplexer 155 and a select signal 160, which is derived from an accumulator register file write source. This load operation of Z' can be done in parallel with the matrix multiplication AB so that the accumulation operation can perform Z=AB+Z' in one clock cycle.

In one embodiment, to initialize the processing engine 150, the addend matrix C which is shown as being stored in the matrix operand register 120 can also be stored in the L1 operand cache 115 and the L1 accumulator cache 145, or outside the processing engine 150. A data move instruction (e.g., the select signal 160) selects the appropriate source of the addend matrix C and moves it through the multiplexer 155 into one of the accumulators in the accumulator registers 140. To save storage for the common case whether every column is the same in the addend matrix C, this repeated column vector is stored once and the data move replicates the column vector into a matrix. For example, the column vector may be the bias vector in a dense layer of a neural network. This replication of the column vector can be referred to as broadcasting the vector.

The output of the arithmetic circuit 125 is coupled to the accumulator registers 140 (memories) which store the results of the matrix multiplier 130. In addition to storing results in the registers 140, the arithmetic circuit 125 can also read results from the registers 140 to use as an input to the adder circuit 135 to perform, e.g., an accumulation operation.

The accumulator registers 140 are coupled to the L1 accumulator cache 145 so that the results can be stored and later transmitted to other components in the IC 100 via the output interconnection network 110. In general, the capacity of the registers 120, 140 is less than the capacity of the L1 operand cache 115 and the L1 accumulator cache 145.

In one embodiment, the processing engine 150 outputs one affine transformation per clock cycle. Further, the processing engine 150 does not generate any cache misses, which is a large contributor to wasting bandwidth. That is, the processing engine 150 does not have any cache control circuitry for evicting and filing the caches 115, 145 since a compiler has determined that cache read-write sequence ahead of time to guarantee a 100 percent hit rate. By using the L1 and register memory structure in FIG. 1, the processing engine 150 always has the data ready for the arithmetic circuit 125 and can avoid costly cache misses.

Figure 2:
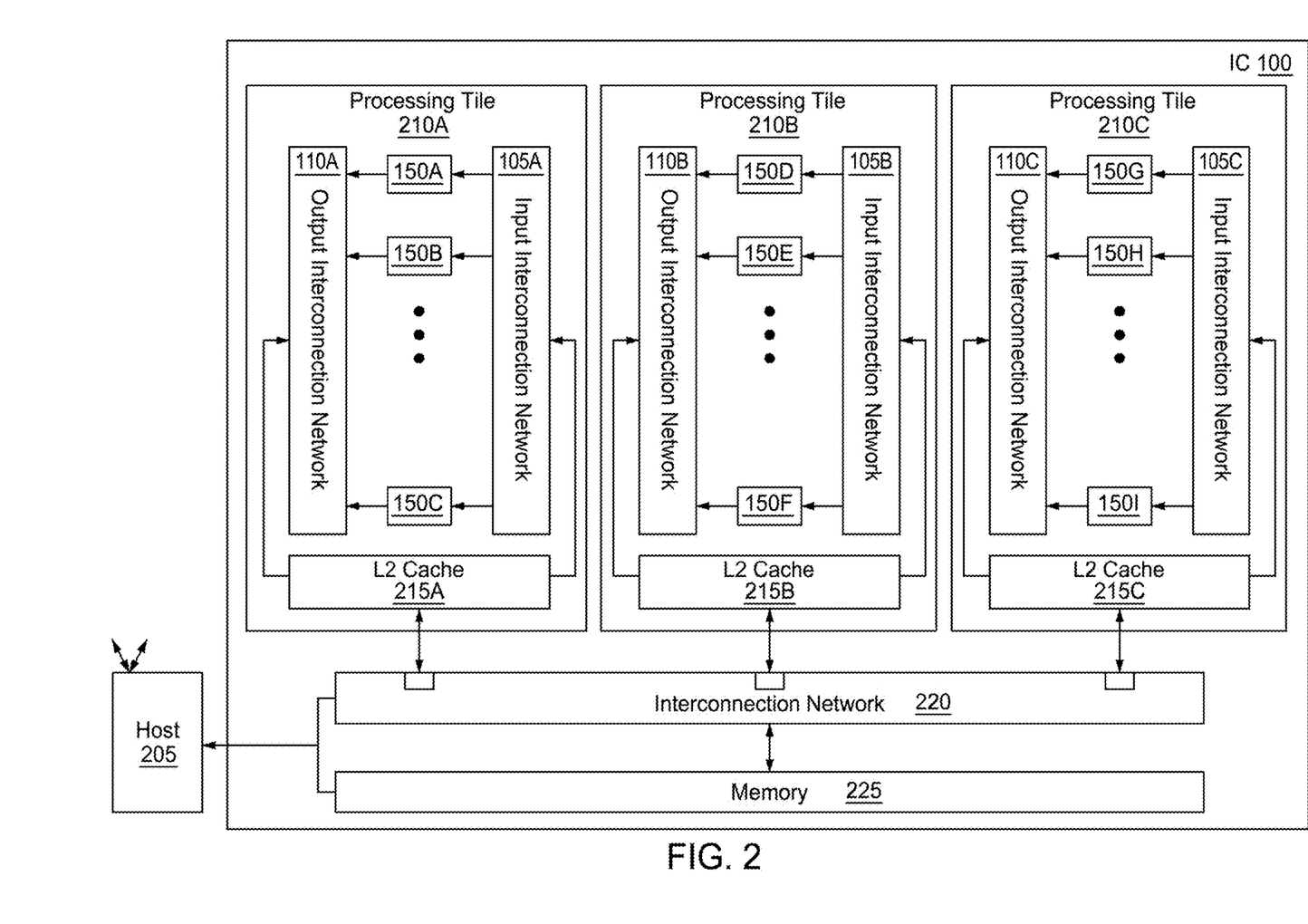
FIG. 2 is a block diagram of an integrated circuit with a processing tiles accelerated for performing affine transformations, according to an example.

FIG. 2 is a block diagram of an integrated circuit with a processing tiles accelerated for performing affine transformations, according to an example. The IC 100 includes multiple processing tiles 210 that each contains multiple processing engines 150 that can operate in parallel. The processing engines 150 in each tile 210 are coupled to the same input and output interconnection networks 105, 110 which permit the engines 150 to store and retrieve data from a L2 cache 215.

The L2 caches 215 are in turn coupled to an interconnection network 220 that is coupled to a host 205 and a memory 225 (e.g., a L3 cache, on-chip RAM, or external RAM or memory).

FIG. 2 illustrates a hierarchical hardware accelerator where the innermost structure are the processing engines 150, the middle structure is the processing tiles 210, and the outermost structure is the interconnection network 220 and the memory 225. Functionally, this hierarchical hardware structure reduces the amount of memory bandwidth used for performing affine transformations by computing matrix multiplication as a sum of outer products.

Figure 3:
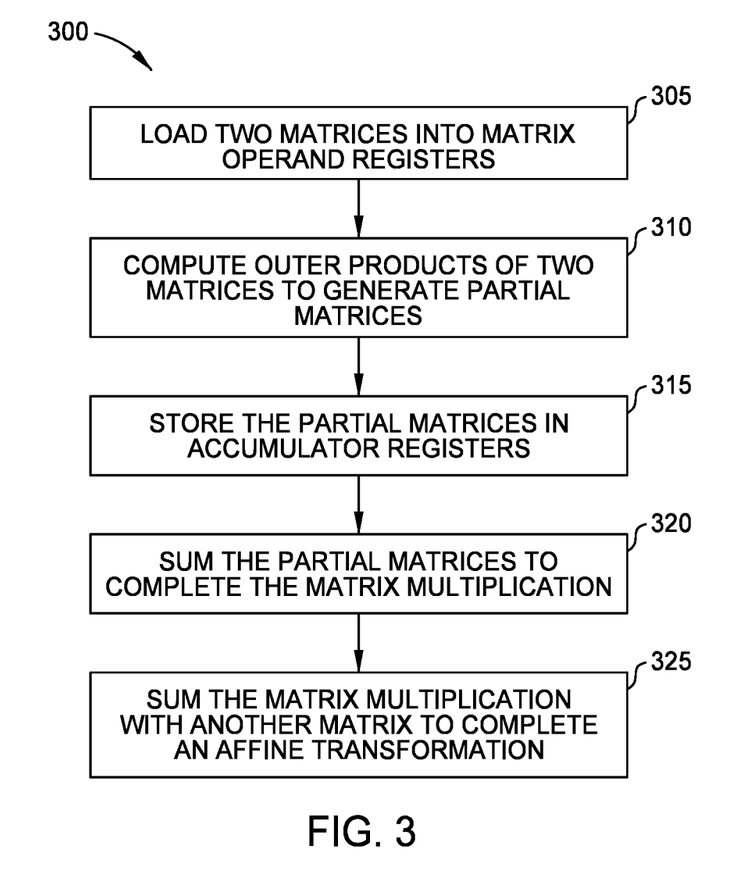
FIG. 3 is a flowchart for performing matrix multiplications using outer products, according to an example.

FIG. 3 is a flowchart of a method 300 for performing matrix multiplications using outer products, according to an example. For clarity, the method 300 is discussed using the circuitry and hardware disclosed in FIGS. 1 and 2.

At block 305, the processing engine 150 loads two matrices (or portions of the two matrices) into the matrix operand registers (e.g., the registers 120). As mentioned above, these matrices can be loaded into the registers without incurring cache misses. That is, the compiler can determine when the matrix data is needed and design the processing engines 150 to ensure this data has already been loaded into the L1 operand cache 115. Using the method 300, the processing engine 150 performs a matrix multiplication.

At block 310, the matrix multiplier 130 computes outer products of the two matrices to generate partial matrices. Performing output products generate partial or intermediate matrices that then are summed to result in a final matrix. In contrast, performing inner products comprises multiplying a row vector and column vector to result in a scalar value for the final matrix. As a result, the hardware must finish one inner product before moving on to the next. There is no option to skip over the summation and reuse a number for another inner product, which means that the hardware must constantly fetch data from either registers or memory.

While forming inner products requires only one accumulator, the memory bandwidth to fetch operands is maximal because both inputs in the matrix multiplier change in every step. With outer products however, the same number is attached to one of the multiplier inputs over several steps, which saves bandwidth. This is best illustrated using an example where the following two matrices are being multiplied together using outer products.

$$\begin{bmatrix} 2 & 6 \\ 3 & 7 \\ 4 & 8 \\ 5 & 9 \end{bmatrix} \begin{bmatrix} 20 & 22 & 24 \\ 21 & 23 & 25 \end{bmatrix}$$

The outer product operation creates a matrix from a left column vector and a right row vector using multiplication only. There are two equivalent methods to compute outer products. In one method, the matrix multiplier can use each element in the row vector to scale the column vector, for instance:

$$\begin{bmatrix} 2 \\ 3 \\ 4 \\ 5 \end{bmatrix} \begin{bmatrix} 20 & 22 & 24 \end{bmatrix} = \begin{bmatrix} 20 \begin{bmatrix} 2 \\ 3 \\ 4 \\ 5 \end{bmatrix}, 22 \begin{bmatrix} 2 \\ 3 \\ 4 \\ 5 \end{bmatrix}, 24 \begin{bmatrix} 2 \\ 3 \\ 4 \\ 5 \end{bmatrix} \end{bmatrix} = \begin{bmatrix} 2 \times 20 & 2 \times 22 & 2 \times 24 \\ 3 \times 20 & 3 \times 22 & 3 \times 24 \\ 4 \times 20 & 4 \times 22 & 4 \times 24 \\ 5 \times 20 & 5 \times 22 & 5 \times 24 \end{bmatrix}$$

Alternatively, the matrix multiplier can use each element in the column vector to scale the row vector.

$$\begin{bmatrix} 2 \\ 3 \\ 4 \\ 5 \end{bmatrix} \begin{bmatrix} 20 & 22 & 24 \end{bmatrix} = \begin{bmatrix} 2[20 & 22 & 24] \\ 3[20 & 22 & 24] \\ 4[20 & 22 & 24] \\ 5[20 & 22 & 24] \end{bmatrix} = \begin{bmatrix} 2 \times 20 & 2 \times 22 & 2 \times 24 \\ 3 \times 20 & 3 \times 22 & 3 \times 24 \\ 4 \times 20 & 4 \times 22 & 4 \times 24 \\ 5 \times 20 & 5 \times 22 & 5 \times 24 \end{bmatrix}$$

Unlike the inner product, there is no addition involved in computing the outer product. The partial matrices shown above are full of scalar products. The final result is the sum of these outer products, so the partial matrices can also be called partial-sum matrices. The outer product lets us attach the same number to one of the multiplier inputs to save bandwidth.

To multiply two matrices, the matrix multiplier forms an outer product for each position along the inner dimension (the number of columns of the left matrix, which must also be the number of rows of the right matrix). In this example, the inner dimension is 2. Therefore, the matrix multiplier computes two outer products (e.g., two partial matrices) that are summed to complete the matrix multiplication shown below:

$$\begin{bmatrix} 2 & 6 \\ 3 & 7 \\ 4 & 8 \\ 5 & 9 \end{bmatrix} \begin{bmatrix} 20 & 22 & 24 \\ 21 & 23 & 25 \end{bmatrix} = \begin{bmatrix} 2 \\ 3 \\ 4 \\ 5 \end{bmatrix} \begin{bmatrix} 20 & 22 & 24 \end{bmatrix} + \begin{bmatrix} 6 \\ 7 \\ 8 \\ 9 \end{bmatrix} \begin{bmatrix} 21 & 23 & 25 \end{bmatrix} =$$

$$\begin{bmatrix} 2 \times 20 & 2 \times 22 & 2 \times 24 \\ 3 \times 20 & 3 \times 22 & 3 \times 24 \\ 4 \times 20 & 4 \times 22 & 4 \times 24 \\ 5 \times 20 & 5 \times 22 & 5 \times 24 \end{bmatrix} + \begin{bmatrix} 6 \times 21 & 6 \times 23 & 6 \times 25 \\ 7 \times 21 & 7 \times 23 & 7 \times 25 \\ 8 \times 21 & 8 \times 23 & 8 \times 25 \\ 9 \times 21 & 9 \times 23 & 9 \times 25 \end{bmatrix}$$

Performing outer products can save bandwidth in at least two ways: using row vector elements to scale column vectors or using column vector elements to scale row vectors. Using the previous example, the numbers 20 to 25 in the row vectors appear four times per column. Reading the number 20 once and using it four times to multiply it by 2, 3, 4, and 5 reduces bandwidth. In four steps, the arithmetic circuit 125 reads five unique numbers. Consequently, the input bandwidth is 5/4 numbers per step. By contrast, computing inner products first requires reading two numbers per step, costing 60% more operand bandwidth.

As an example of column vector elements scaling row vectors, the numbers 2 to 9 in the column vectors appear three times per row. Reading the number 2 from the left matrix once and using it three times to multiply it by 20, 22, and 24 reduces input bandwidth. In these three steps, the arithmetic circuit 125 reads four unique numbers, as opposed to six when performing inner products. The input bandwidth is 4/3 numbers per step. Therefore, computing inner products costs 50% more operand bandwidth.

At block 315, the processing engine stores the partial matrices in the accumulator registers 140. In the previous example, the processing engine stores a 4×3 partial matrix in the accumulation registers 140. In other words, the method 300 keeps 12 scalar partial sums around, whereas the inner product method keeps just one. In hardware, the processing engine 150 can use the registers 140 or SRAM near the arithmetic circuit 125 to hold partial matrices. This storage (e.g., the register 140) acts as both an input cache and an output cache since the arithmetic circuit 125 reads from it to recall the previous partial matrix and writes to it to update it. In other words, the partial-sum matrix storage reduces operand bandwidth.

At block 320, the matrix multiplier 130 sums the partial matrices to complete the matrix multiplication.

At block 325, the adder circuit 135 sums the matrix multiplication with another matrix to complete the affine transformation. This other matrix may also be stored in the accumulator registers 140. For example, the output of the matrix multiplier 130 may be added to another matrix already stored in the accumulator registers 140 by the adder circuit 135. The result of the affine transformation is then stored in the register 140, and during a later clock cycle, may be transmitted to the L1 accumulator cache 145.

The affine transformation may be Z<--AB+C or an accumulation operation Z<--AB+Z.

While the previous example illustrates using a scalar multiplier and a scalar adder sequentially to perform matrix multiplication, hardware often performs operations on matrices rather than scalars. The scalars above can be replaced with a block matrix (defined as a matrix within a matrix, or a submatrix) and use multiple multipliers and adders in parallel to reduce the number of steps. Further, the hardware of the processing engine 150 is often unable to perform an affine transformation for the entire input matrices at one time. Thus, the input matrices are subdivided into the block matrices or submatrices. Operating on block matrices is shown in more detail in FIGS. 4-5.

Assume the matrix multiplier 130 includes a block matrix multiplier that multiplies a 2×2 matrix by a 2×1 matrix in one step of clock cycle. To use this special multiplier for the previous matrix multiplication, the processing engine partitions the left matrix into 2×2 block matrices and the right matrix into 2×1 block matrices. This partitioning is shown below:

$$\left[ \begin{bmatrix} 2 & 6 \\ 3 & 7 \\ 4 & 8 \\ 5 & 9 \end{bmatrix} \right] \left[ \begin{bmatrix} 20 \\ 21 \end{bmatrix} \begin{bmatrix} 22 \\ 23 \end{bmatrix} \begin{bmatrix} 24 \\ 25 \end{bmatrix} \right]$$

Three numbers define the sizes of the matrices involved. The shape of the affine transformation Z<--AB+C as the triple (M, K, N), where A, the multiplier, is an M×K matrix, B, the multiplicand, is a K×N matrix, and both C, the addend, and Z, the accumulator, are M×N matrices.

The parameters M and N are the outer dimensions. The parameter K is the inner dimension. The number of (arithmetic) operations in an (M, K, N) affine transformation is 2MKN because it uses MKN scalar multiplications and also MKN scalar additions. (There are MK elements in the output matrix. Each element takes K multiplications and K additions to compute.) The dimensions M, K, and N are typically much larger than the dimensions of what a hardware arithmetic circuit can process in one hardware clock cycle (one "step"). Therefore, the block matrix multiplier uses multiples cycles to complete an affine transformation.

Suppose that the arithmetic circuit shape is $(m_0, k_0, n_0)$, that is, its throughput is an $(m_0, k_0, n_0)$ affine transformation per cycle, although the latency may be more than a cycle. Using the block matrix method, this arithmetic circuit takes $\lceil M/m_0 \rceil \lceil K/k_0 \rceil \lceil N/n_0 \rceil$ cycles to stream out its results.

Figure 4:
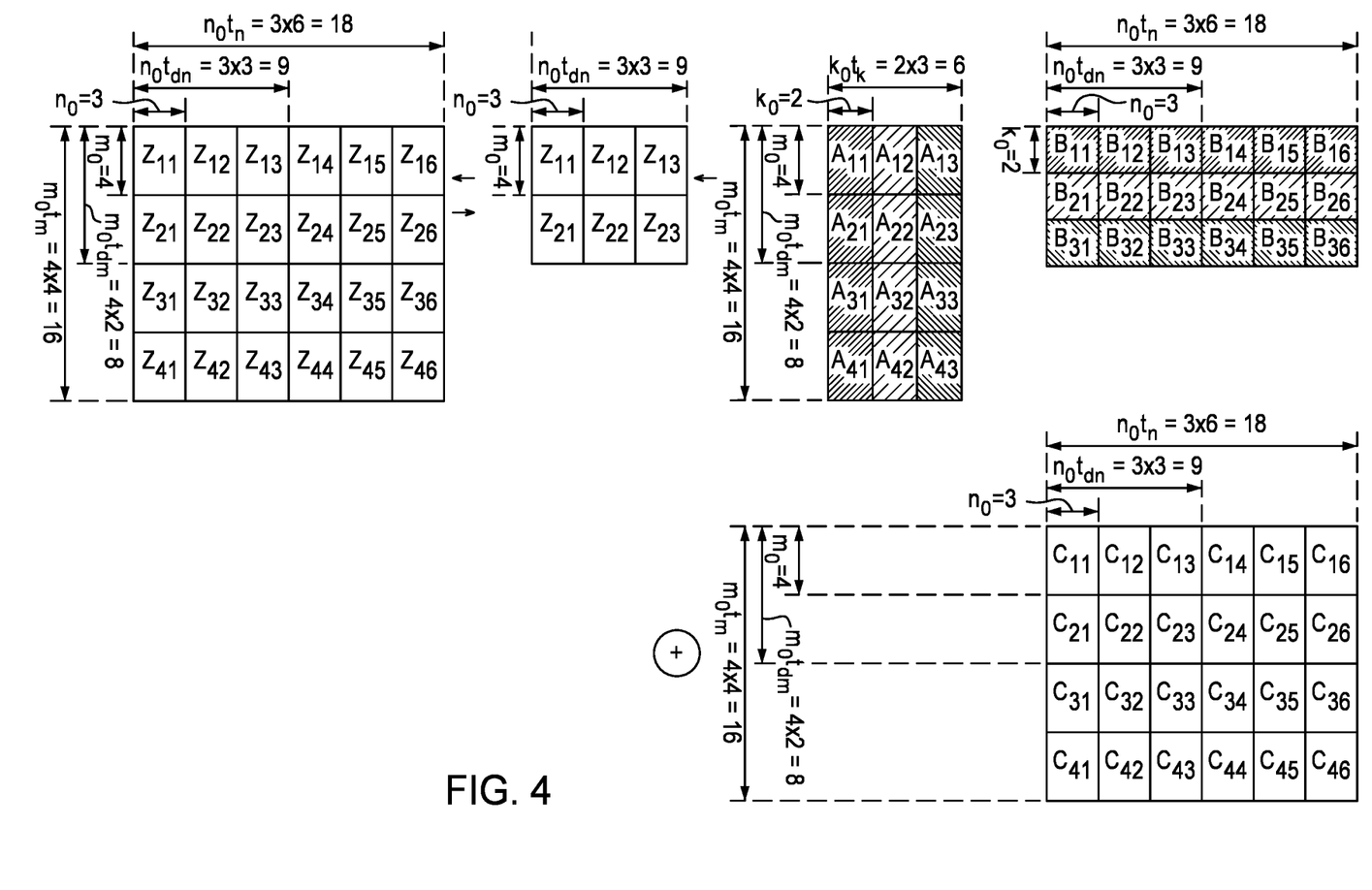
FIG. 4 illustrates a block affine transformation using block matrices, according to an example.

FIG. 4 illustrates a block affine transformation using block matrices, according to an example. Specifically, FIG. 5 illustrates a $(m_0, k_0, n_0)=(4, 2, 3)$ processing engine evaluating an (M, K, N)=(8, 6, 9) affine transformation. FIG. 4 assigns the same hashing to block matrices in the same position along the inner dimension because they are used later to illustrate the outer products method.

As discussed above, to make the processing engine 150 bandwidth-efficient, the arithmetic circuit 125 is attached to input registers 120 and the accumulator registers 140. Moreover, the L1 operand cache 115 feeds the input registers 120 while the L1 accumulator cache 145 communicates with the accumulator registers 140. In one embodiment, the block matrices flow only from the operand L1 cache 115 into the input registers 120, whereas accumulator matrices flow both ways between the accumulator registers 140 and the L1 accumulator cache 145 because the processing engine 150 may need to update accumulators. Typically, registers can sustain higher bandwidth than an L1 cache, but because registers are less dense (in bits per unit area), having both register files and L1 caches on both sides (the operand side and the accumulator side) strikes a balance between performance and costs. Because the L1 cache size is limited, the IC can include more levels in the memory hierarchy with less bandwidth but higher capacity and density. Higher levels of the memory hierarchy are no longer for just one processing engine. Instead, as shown in FIG. 2, the interconnection networks can be used to share higher-level memory (for instance, an L2 cache or external DRAM) among the processing engines 150.

FIG. 4 introduces two primary temporal parameters $t_m$ and $t_n$ and three secondary temporal scaling factors $t_{dm}$, $t_k$, and $t_{dn}$, where $t_{dm} \leq t_m$ and $t_{dn} \leq t_n$. The primary temporal parameters $t_m$ and $t_n$ set the outer dimensions of the block matrixed in the L1 cache to be $m_0 t_m$ and $n_0 t_n$. The other two secondary temporal scaling factors, $t_{dm}$ and $t_{dn}$, set the innermost loop outer dimensions to be $m_0 t_{dm}$ and $n_0 t_n$.

The parameter suffixes suggest the axis along which we scale a block matrix. For instance, the parameter $t_m$ scales an $m_0 \times k_0$ matrix to be an $m_0 t_m \times k_0$ block matrix. The parameter $t_m$ reduces the right (multiplicand) operand bandwidth because the engine 150 stores $t_m$ left (multiplier) operands in the L1 input cache 115. Similarly, the parameter to reduces the left (multiplier) operand bandwidth because the engine 150 stores to right (multiplicand) operands in the L1 cache 115.

If the accumulator L1 cache 145 is slower than the accumulator registers 140 by the factor $t_k$, then the compiler reduces the communication bandwidth between the accumulator L1 cache 145 and the accumulator registers 140 by extending the operands the engine 150 stores by the factor $t_k$ along the block inner dimension. In other words, instead of storing $t_m$ multiplier matrices, the engine 150 stores an array of $t_m \times t_k$ block matrices, that is, a block matrix of the shape $m_0 t_m \times k_0 t_k$, and correspondingly, the engine 150 also stores an array of $t_k \times t_n$ multiplicand block matrices, that is, a $k_0 t_k \times n_0 t_n$ block matrix.

The parameters $t_{dm}$, $t_k$, and $t_{dn}$ define the innermost loops. The processing engine uses $t_{dm} t_{dn}$ fast accumulators to evaluate an $(m_0 t_{dm}, k_0 t_k, n_0 t_{dm})$ affine transformation, unencumbered by the slower accumulator L1 cache 145.

To induce temporal locality, the processing engine 150 processes an affine transformation larger than $(m_0, k_0, n_0)$ over multiple steps. Consider an $(m_0, k_0, n_0)$ processing engine using $t_m t_k t_n$ steps to evaluate an affine transformation of the shape $(m_0 t_m, k_0 t_k, n_0 t_n)$. This matrix multiplication can be divided into smaller chunks of $t_{dm} t_k t_{dn}$ steps, using $t_{dm} t_{dn}$ matrix accumulators to store that many output block matrices. (Typically, $t_m$ is a multiple of $t_{dm}$ and to is a multiple of tan.) Each chunk of these steps evaluates an affine transformation of the intermediate shape $(m_0 t_{dm}, k_0 t_k, n_0 t_{dn})$.

Figure 5A:
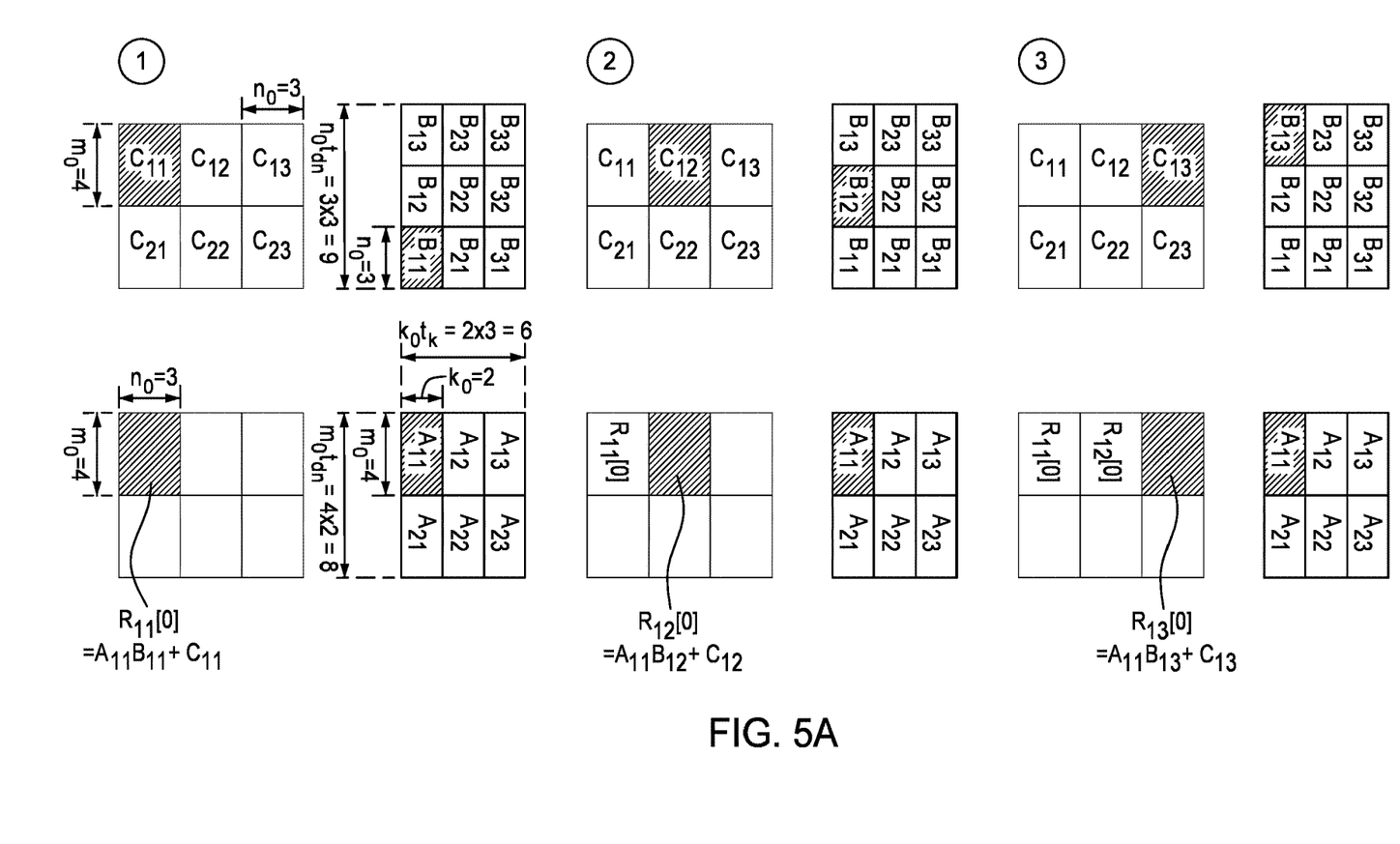
FIGS. 5A-5F illustrate performing matrix multiplication using outer products on block (sub)matrices, according to an example.

FIGS. 5A-F4 illustrate a step-by-step process that zooms into one such chunk of $t_{dm} t_k t_{dn} = 2 \times 3 \times 3 = 18$ steps. Each step in these figures, in turn, illustrates an even smaller chunk of $t_{dm} t_{dn} = 2 \times 3 = 6$ steps for one block location along the inner dimension for creating one (block matrix) outer product.

Figure 5B:
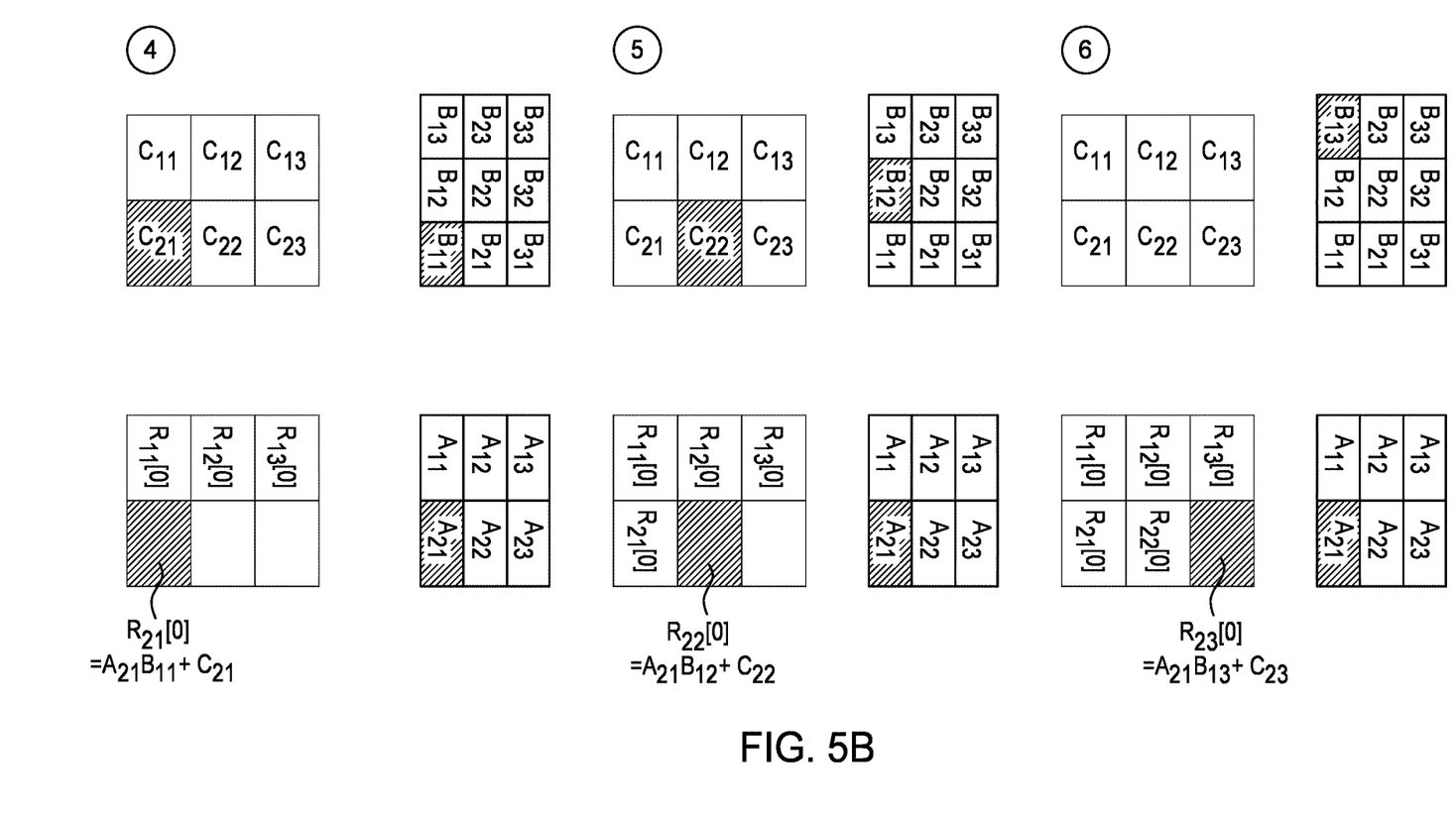

In FIGS. 5A-5F, the B matrix is rotated 90 degrees to better illustrate performing outer products. FIGS. 5A and 5B illustrate the six steps for one block location along the inner dimension for creating one (block matrix) outer product that is stored in the R matrix (i.e., $R_{11}$-$R_{23}$). As shown, the block matrix $A_{11}$ is multiplied by the $B_{11}$-$B_{13}$ matrices in the first three steps while the block matrix $A_{21}$ is multiplied by the same $B_{11}$-$B_{13}$ matrices in the next three steps. The results are then stored as $R_{11}$-$R_{23}$ block matrices. Doing so saves bandwidth since the $A_{11}$ and $A_{21}$ block matrices are stored in the input registers 120 only once, but are reused three times. Similarly, each $B_{11}$-$B_{13}$ block matrix can be stored once, but read twice (assuming the registers 120 have sufficient room to store all three of the block matrices). Thus, the outer products save bandwidth relative to the inner products where two different block matrices would be retrieved from the cache during each step.

Figure 5C:
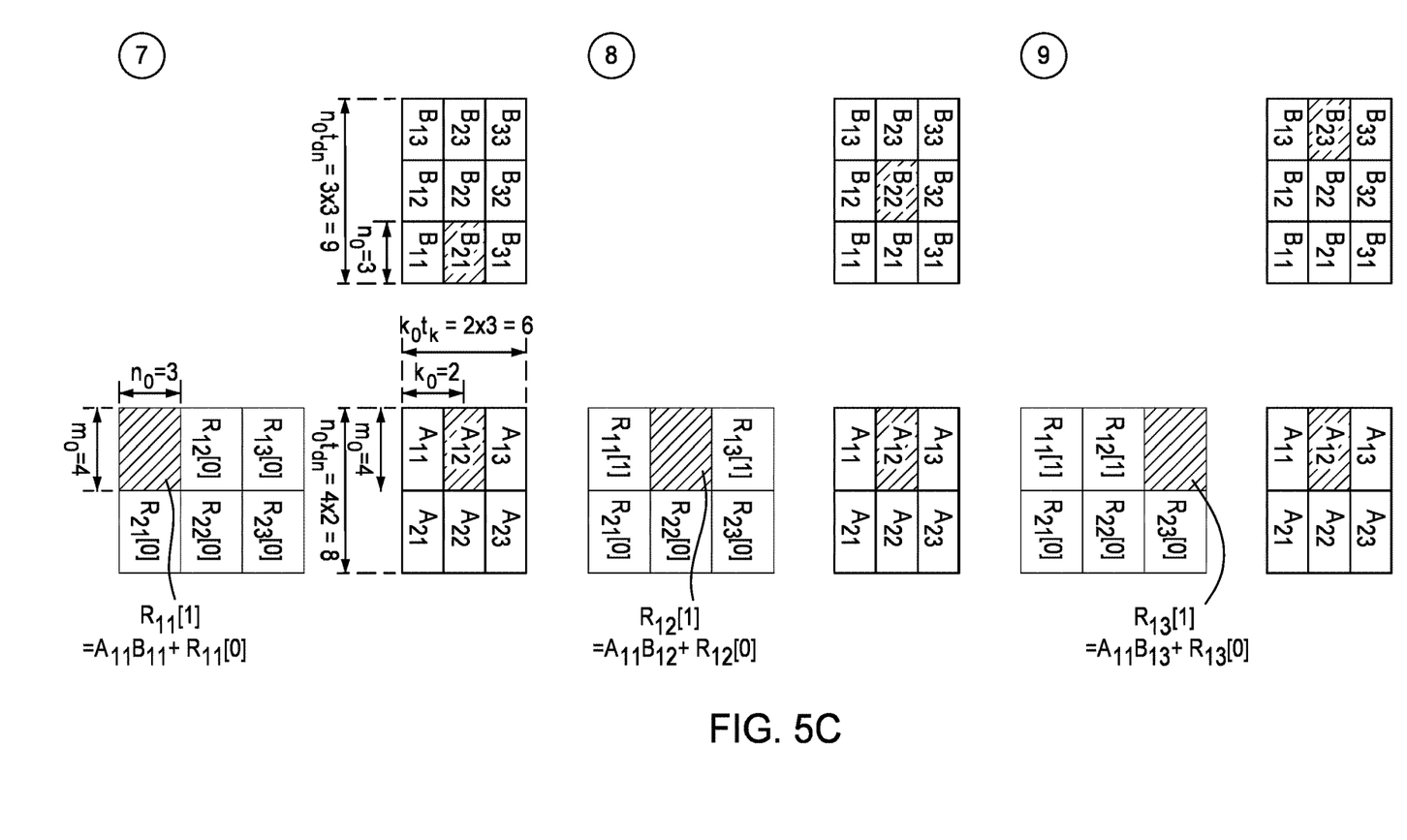
Figure 5D:
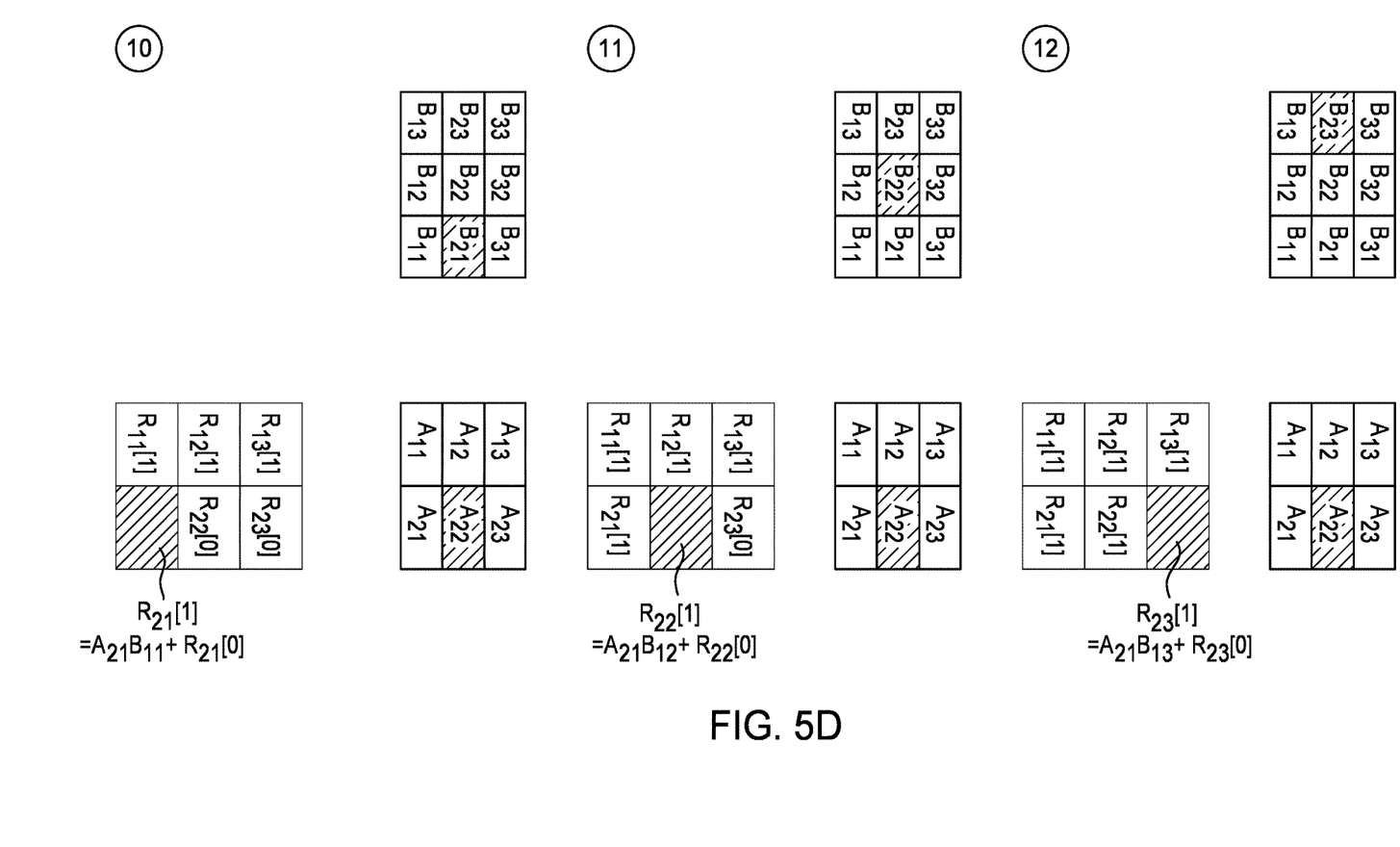

FIGS. 5C and 5D illustrate the next six steps of outer products where the block matrices in the second column of the A matrix are multiplied with the block matrices in the second row of the B matrix. The results are then summed (i.e., accumulated) with the results that were already stored in the R matrix from performing the first six steps. FIGS. 5C and 5D illustrate that outer products continue to provide the same bandwidth savings as shown in FIGS. 5A and 5B.

Figure 5E:
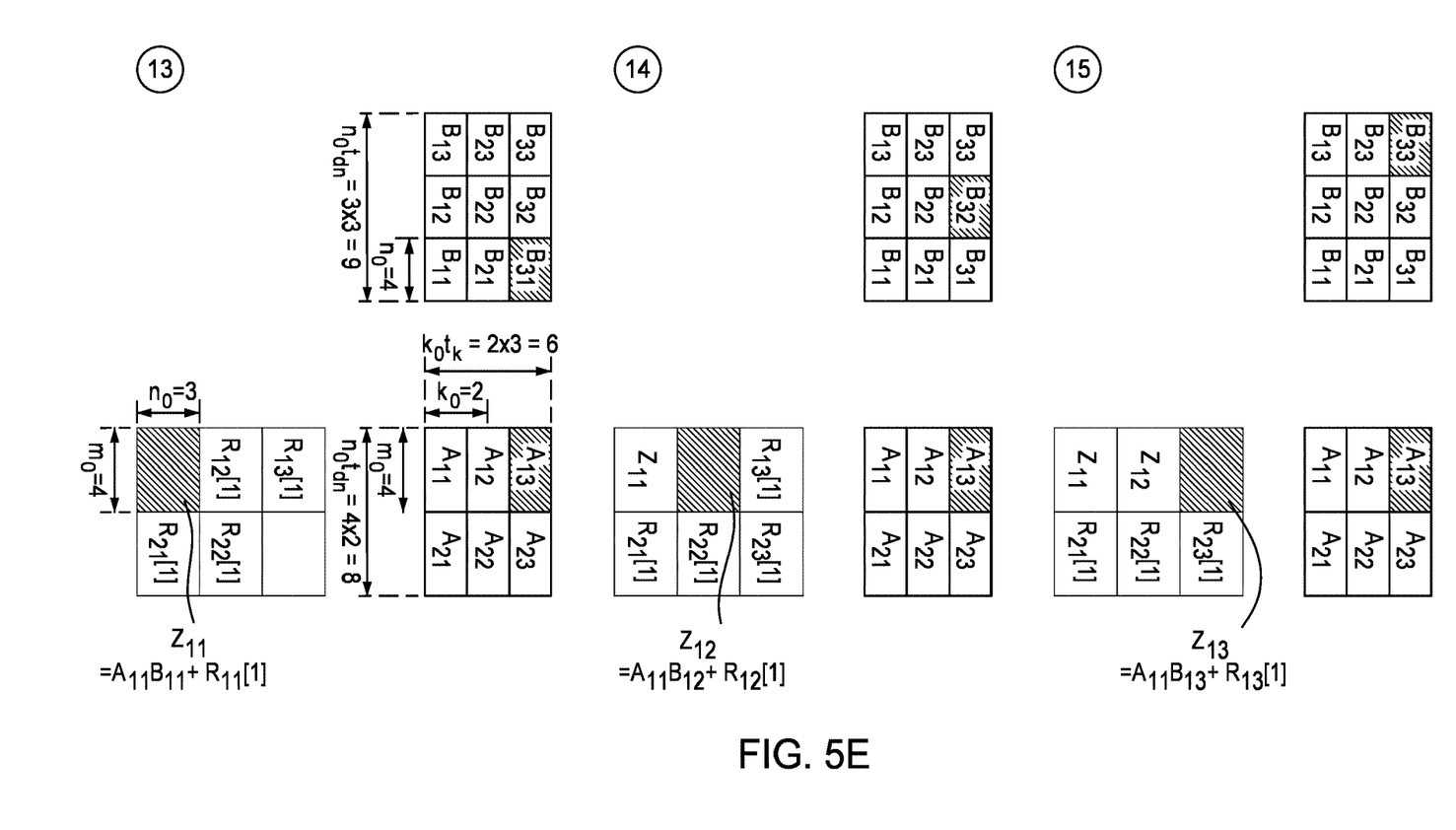
Figure 5F:
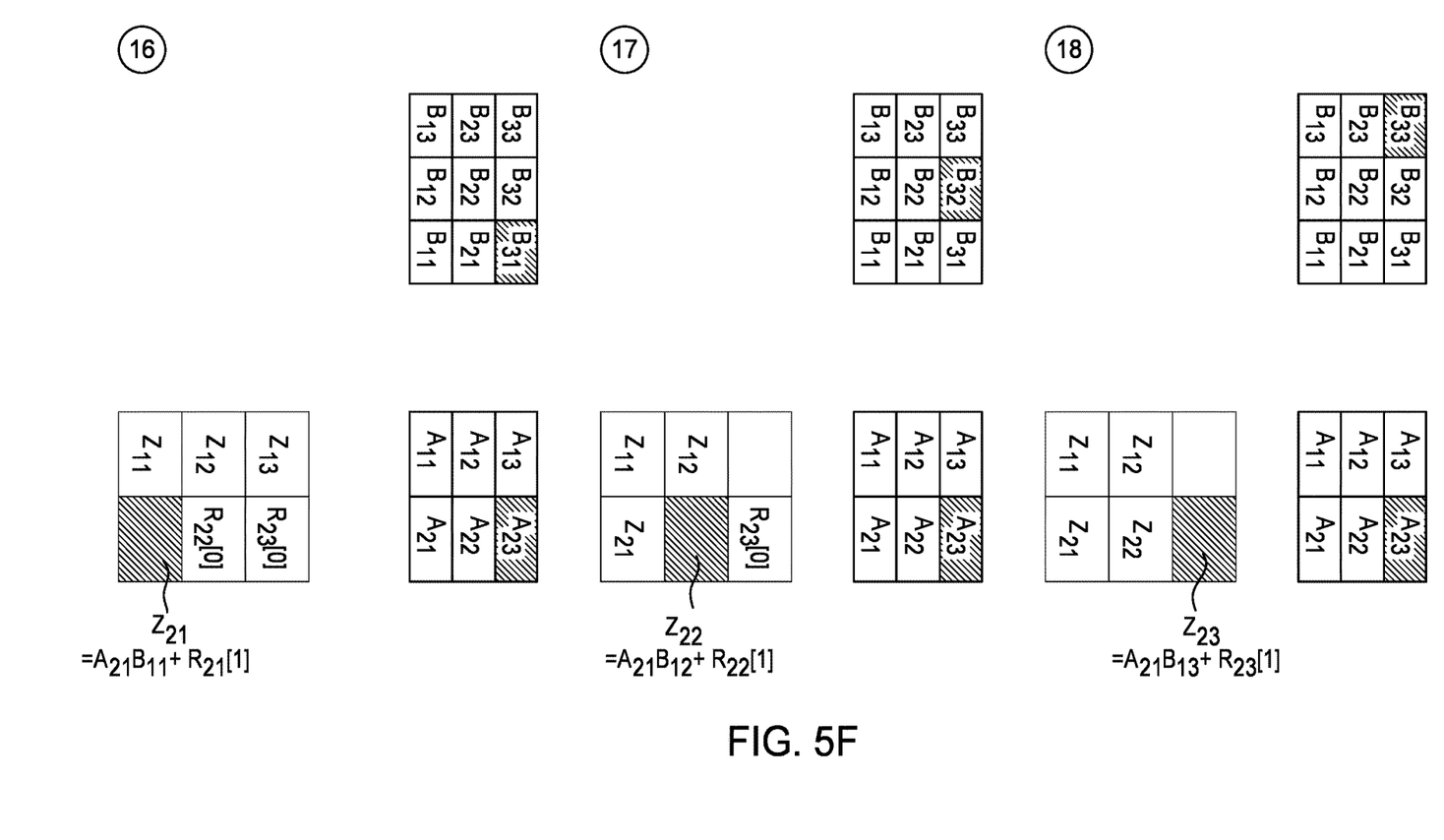

FIGS. 5E and 5F illustrate the final six steps of outer products where the block matrices in the third column of the A matrix are multiplied with the block matrices in the third row of the B matrix. The results are then summed (i.e., accumulated) with the results that were already stored in the R matrix from performing the first 12 steps. FIGS. 5E and SF illustrate that outer products continue to provide the same bandwidth savings as shown in FIGS. 5A-5D.

In addition to saving bandwidth by performing outer products, because multiple processing engines 150 share the bandwidth of the input interconnection network 105 as shown in FIG. 2, the compiler can select how many matrices should be stored in the L1 input cache 115 to prevent the network 105 from becoming a bottleneck. The compiler can formulate the bandwidth constraints as inequalities and solve for the primary temporal parameters $t_m$ and $t_n$. If the input cache 115 cannot accommodate this many block matrices, or if the affine transformation is too small, then the affine transformation becomes bandwidth-bound.

To enable data reuse, the engines 150 store multiplication operands in the L1 input cache 115. Unlike a CPU cache, this cache 115 never misses because the compiler determines all data movement ahead of time. The design of L1 input cache 115 is, therefore, simpler than a general-purpose cache because no circuitry dynamically decides what cache entries it should keep or evict.

The L1 input cache 115 can be designed to cache $t_m \times t_k$ left (multiplier) block matrices and also $t_k \times t_n$ right (multiplicand) block matrices. These matrices share the same location along the inner dimension to form outer products. The arithmetic circuit 125 only reads from this cache, which receives data externally, for instance, from some other processing unit, the L2 cache 215, or other memory 225.

The accumulator registers 140 can be designed to cache $t_{dm} \times t_{dn}$ output block matrices. In one embodiment, the accumulator registers 140 are only used when the L1 accumulator (output) cache 145 does not have enough bandwidth to send and receive an $m_0 \times n_0$ block matrix per step.

The L1 accumulator cache 145 can be designed to store $t_m \times t_n$ output block matrices. As discussed below, the secondary temporal parameter $t_k$ can reduce the required bandwidth for the accumulator L1 cache 145. In one embodiment, only the arithmetic circuit 125 writes this cache 145 when initializing or updating accumulators. The arithmetic circuit 125 reads partial matrices from this cache 145 for further accumulation. When accumulation completes, the final matrices leave this cache 145. In one embodiment, the arithmetic circuit 125 does not read the final matrices.

Referring again to the example in FIG. 4, the affine transformation shape is (M,K,N)=(16, 6, 18). An (m0, k0, n0)=(4, 2, 3) processing engine caches an $m_0 t_m \times k_0 t_k = (4 \times 4) \times (2 \times 3) = 16 \times 6$ left block matrix and a $k_0 t_k \times n_0 t_n = (2 \times 3) \times (3 \times 6) = 6 \times 18$ right matrix in its input L1 cache 115. The accumulator L1 cache 145 stores an $m_0 t_m \times n_0 t_n = 16 \times 18$ output matrix. The processing engine 150 consumes its inputs and produces the result in $t_m t_k t_n = 4 \times 3 \times 6 = 72$ steps. This number matches the expression $\lceil M/m_0 \rceil \lceil K/k_0 \rceil \lceil N/n_0 \rceil$ because the temporal parameters $(t_m, t_k, t_n)$ are set to $\lceil M/m_0 \rceil \lceil K/k_0 \rceil \lceil N/n_0 \rceil$.

The input cache replenishing bandwidth is the number of block matrix bits in the input cache 115 divided by the number of steps (time) the arithmetic circuit 125 uses to produce the output block matrices. To calculate the required bandwidth, the compiler also uses the operand element sizes in bits. Let "a" be the number of bits in each left block matrix element. Likewise, let "b" be the number of bits in each right block matrix element. For instance, if each element of the left matrix is an 8-bit integer (either int8 or uint8), a=8. If each element of the right matrix is a 16-bit floating-point number, b=16. The read bandwidth for the left block matrices is:

$$\frac{am_0 t_m k_0 t_k}{t_m t_k t_n} = \frac{am_0 k_0}{t_n} \text{ bits per step.}$$

The read bandwidth for the right block matrices is:

$$\frac{bk_0 t_k n_0 t_n}{t_m t_k t_n} = \frac{bk_0 n_0}{t_m} \text{ bits per step}$$

The parameter $t_k$ does not appear in the simplified version of these expressions because, as shown later, $t_k$ only reduces bandwidth to accommodate the accumulator L1 cache 145, which may not be able to keep up with one read and one write of an $m_0 \times n_0$ output block matrix per step. If the accumulator L1 cache 145 can keep up with the arithmetic circuit, the temporal parameters $(t_m, t_k, t_n)$ are set to $(1, t_m, t_n)$.

Further, the left block matrix replenishing bandwidth is inversely proportional to the number of right matrices $(t_n)$ in the input cache 115 and the right block matrix replenishing bandwidth is inversely proportional to the number of left matrices $(t_m)$ in the input cache 115.

In accelerators where the bandwidth consumption should be adjusted for each operand, the last two features allow the compiler to dial down operand-specific bandwidth using $t_m$ and $t_n$ as two different knobs. As an example, current fabrication technologies permit the IC to include over 300 (m0, k0, n0)=(8, 8, 4) processing engines 150. Assuming 8-bit inputs (a=b=8), each processing engine 150 consumes, in the worst case $(t_m = t_n = 1)$, $m_0 k_0 + k_0 n_0 = 8 \times 8 + 8 \times 4 = 96$ bytes per step. At one 1 GHz cycle per step, each processing engine 150 consumes 96 bytes/cycle or 96 GB/s, almost four DDR4-3200 channels (102.4 GB/s). This bandwidth does not include the other operand C and the output matrix. Suppose that the bandwidth from the input interconnection network is SDMA=32 bits/cycle for each multiplier operand. Then we have the constraints:

$$\frac{am_0 k_0}{t_n} \leq S_{DMA} \text{ and}$$

$$\frac{bk_t n_0}{t_m} \leq S_{DMA}.$$

To prevent these constraints from limiting the throughput, it should be the case that $t_m \geq 8$ and $t_n \geq 16$. In other words, if the multiplier matrix has at least $m_0 t_m = 8 \times 8 = 64$ rows and the multiplicand matrix has at least $n_0 t_n = 4 \times 16 = 64$ columns, we can satisfy the input interconnection network bandwidth constraints.

As mentioned above, the temporal parameter ti only affects the bandwidth between the accumulator registers 140 and the accumulator L1 cache 145. Suppose that each accumulator matrix element is z bits wide. To update an accumulator matrix, the arithmetic circuit 125 both reads and writes to this matrix. Therefore, the arithmetic circuit 125 reads from and writes to the accumulator registers 140 at the rate of $zm_0 n_0$ bits per step. Because of this high bandwidth, the accumulator registers 140 are typically not as deep as, but often faster than, the accumulator L1 cache 145. A processing engine that caches $t_{dn} \times t_k$ multiplier block matrices and $t_k \times t_{dn}$ multiplicand block matrices uses $t_{dm} t_k t_{dn}$ steps to consume them all to produce a new array of $t_{dm} \times t_{dn}$ output block matrices. The bandwidth (in each direction) between the accumulator registers 140 and the output L1 cache 145 is, therefore $$\frac{zm_0 t_{dm} n_0 t_{dn}}{t_{dm} t_k t_{dn}} = \frac{zm_0 n_0}{t_k} \text{ bits per step}$$

Recall that the output L1 cache 145 should store $t_m t_n$ output block matrices (each requiring $zm_0 n_0$ bits). The temporal parameter $t_k$ dials down the bandwidth for the output L1 cache 145, enabling the compiler to deepen it, which, in turn, allows higher values for t and $t_n$ that reduce operand bandwidth.

As shown in FIG. 2, processing engines 150 that share the same input interconnection network 105, the same output interconnection network 110, and L2 cache 215 are placed in the same processing tile 210. A hardware accelerator that specializes in computing affine transformations includes a network of processing tiles 210 sharing resources, for instance, a host interface, higher levels of memory (L3 cache and DRAM), other compute engines, say, for transcendental functions, sorting, max-pooling, etc. Because affine transformation sizes are typically larger than a single processing engine 150, grouping physical processing engines 150 into a logically larger processing engine can speed up the computation. For instance, consider an (M,K,N)=(512, 512, 384) affine transformation and (m0, k0, n0)=(8, 8, 4) processing engines 150. One processing engine 150, assuming that it is compute-bound, needs $\lceil M/m_0 \rceil \lceil K/k_0 \rceil \lceil N/n_0 \rceil = \lceil 512/8 \rceil \lceil 512/8 \rceil \lceil 384/8 \rceil = 393{,}216$ steps to evaluate this transformation.

Figure 6:
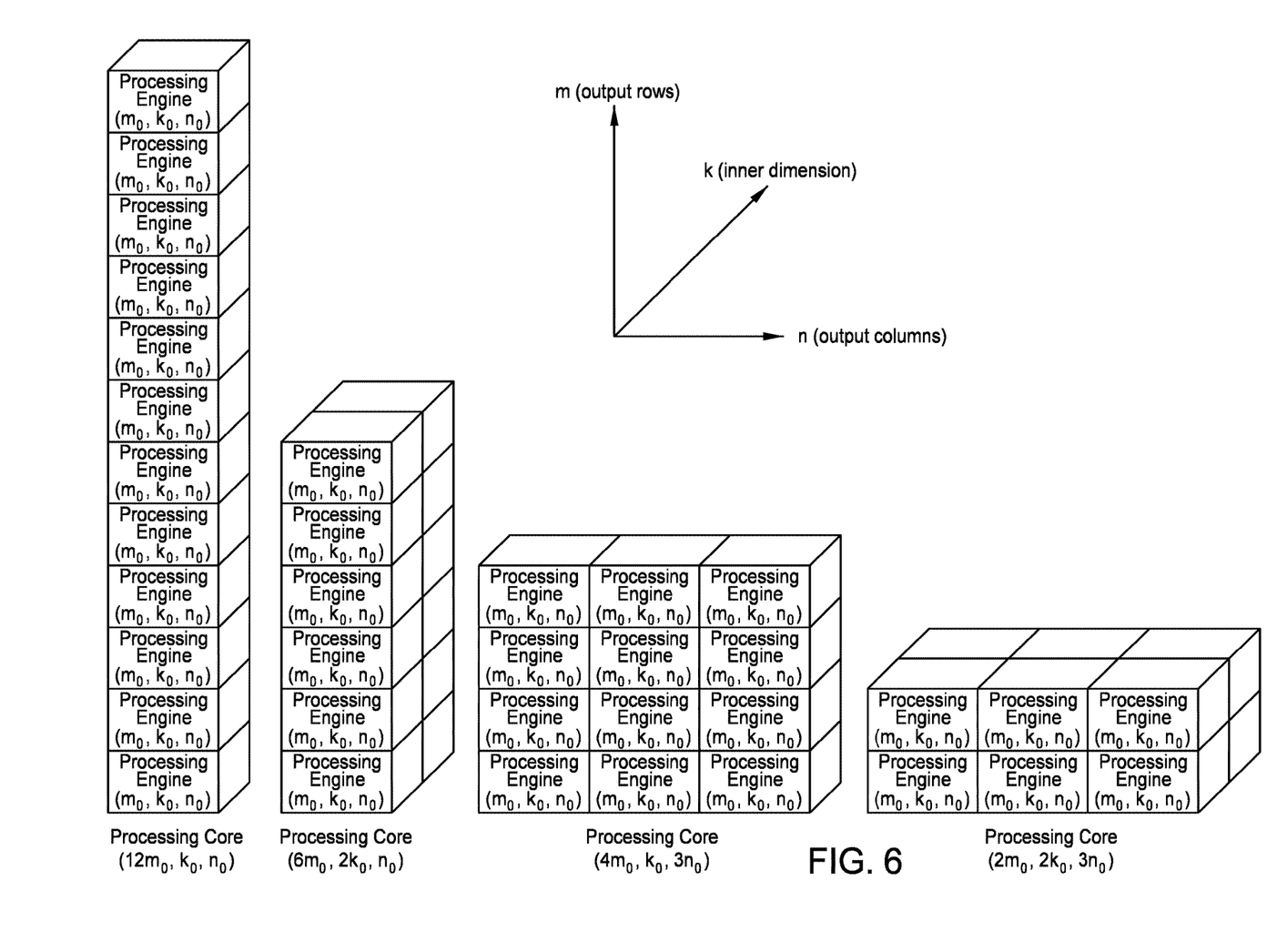
FIG. 6 illustrates spatial scaling of processing engines, according to an example.

FIG. 6 illustrates spatial scaling of processing engines, according to an example. Continuing the example, suppose 12 processing engines 150 are used in parallel instead. FIG. 6 illustrates extending one or more of the three dimensions to get a larger logical processing engine, referred to herein as a processing core. A $(m_0, k_0, n_0)$ processing engine 150 can be thought of as a box with sides $m_0$, $k_0$, and $n_0$. Combining multiple processing engines 150 amounts to stacking boxes. The compiler can stack these boxes along any of the three dimensions. With 12 boxes, the compiler can shape the processing core as (12 $m_0$, $k_0$, $n_0$) or (4 $m_0$, $k_0$, $3n_0$). Although the peak throughput, that is, the total volume of each stack of boxes, is the same in both cases, the realized throughput may differ.

Because a processing engine 150 has three dimensions, as FIG. 6 shows, there are many ways to stack processing engines 150 into processing cores of the same aggregate throughput. However, not all such processing cores consume the same amount of bandwidth, so how much along which dimension we can scale the computation depends on memory constraints. To see this, the input bandwidth for the matrix multiplier inputs in one processing engine is:

$$\frac{am_0k_0}{t_n} + \frac{bk_0n_0}{t_m} \text{ bits per step}$$

This expression applies to a processing core also. In general, given Q processing engines, each of the shape ($m_0$, $k_0$, $n_0$), Q can be decomposed into the product of three integers, $O_m$, $Q_k$, and $Q_n$ such that $Q=Q_mQ_kQ_n$. (m, k, n) can be defined to be $(Q_m m_0, Q_k k_0, Q_n n_0)$. These processing engines are logically stacked into a processing core that produces one $(m, k, n)=(Q_m m_0, Q_k k_0, Q_n n_0)$ affine transformation per step. In the bandwidth expression, the dimensions of the processing engine can be replaced with those of the processing core to derive its bandwidth consumption. For instance, the multiplier input bandwidth is now, in bits per step:

$$\frac{amk}{t_n} + \frac{bkn}{t_m}.$$

which is $$\frac{aQ_m m_0 Q_k k_0}{t_n} + \frac{bQ_k k_0 Q_n n_0}{t_m}.$$

or, $$\left[\frac{am_0k_0}{t_n} \quad \frac{bk_0n_0}{t_m}\right]\begin{bmatrix} Q_m Q_k \\ Q_n Q_k \end{bmatrix}.$$

Notably, these bandwidth expressions have terms such as $m_0k_0$, $k_0n_0$, and mono, and the throughput is $2m_0k_0n_0$. Therefore, the volume of a box represents or models the throughput of the processing core and the side areas of the box represent the bandwidth of the processing core. Scaling processing engines 150 for more throughput is, therefore, an optimization problem subject to bandwidth constraints. Specifically, the number of processing engines, Q, can be decomposed into three integers, $O_m$, $Q_k$, and $Q_n$ such that $Q=Q_mQ_kQ_n$.

Referring to the four stacking configurations in FIG. 6, naming the multiplier input bandwidth of the four processing core examples from left to right in FIG. 6 as [b1 b2 b3 b4], their bandwidth can be expressed as:

$$[b_1 \quad b_2 \quad b_3 \quad b_4] = \left[\frac{am_0k_0}{t_n} \quad \frac{bk_0n_0}{t_m}\right]\begin{bmatrix} 12 & 12 & 4 & 4 \\ 1 & 2 & 3 & 6 \end{bmatrix}$$

As shown, b2>b1 and b4>b3, so if the goal is to reduce bandwidth, the compiler will reject the second and the fourth stacking configurations. For completeness, the values from a previous example can be used, where $(m_0, k_0, n_0)=(8, 8, 4)$, $(t_m, t_n)=(8, 16)$, and a=b=8. Now [b1 b2 b3 b4]=[416 448 224 320], indicating the third configuration with b3=224 consumes the least multiplier input bandwidth. Note that this configuration consumes half the multiplier input bandwidth as the second configuration, making it clear why judicious throughput scaling that minimizes bandwidth is advantageous.

In alternative embodiments, the accumulator registers 140 can be omitted (or bypassed) and the adder circuit 135 can be directly coupled to the L1 accumulator cache 145, if the cache 145 is fast enough to keep up with the arithmetic circuit 125. The output L1 cache 145 should both read and write $zm_0n_0$ bits per cycle. Bypassing the accumulator register file is equivalent to setting the temporal parameter $t_k$ to 1. For example, consider an (m0, k0, n0)=(8, 8, 4) processing engine 150 that produces int32 accumulators (z=32). It both reads and writes $zm_0n_0$=32×8×4=1024 bits per cycle. If the output L1 cache 145 can sustain this bandwidth in both directions, then the accumulator registers 140 can be omitted from the engine 150.

In other alternative embodiments, the operand registers 120 can be omitted or bypassed if the L1 input cache 115 is fast enough to keep the arithmetic circuit 125 busy. There are three thresholds indicating when the cache 115 is fast enough so that the registers 120 can be omitted, depending on how much memory area is dedicated to the cache 115. (For the same memory capacity, a wider (higher bandwidth) memory costs more area than a narrower but deeper memory.) First, the cache 115 is fast enough for the multiplier and multiplicand only: $am_0k_0+bk_0n_0$ bits per cycle. Second, the cache 115 is fast enough for the multiplier, multiplicand, and vector addend only for the affine transformation $Z \leftarrow AB+v1^T$, $v1^T$ being an $m_0 \times n_0$ matrix in which every column is the vector v: $am_0k_0+bk_0n_0+cm_0$. Third, the cache 115 is fast enough for the most general case $Z \leftarrow AB+C$: $am_0k_0+bk_0n_0+cm_0n_0$.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

While the foregoing is directed to specific examples, other and further examples may be devised without departing from the basic scope thereof, and the scope thereof is determined by the claims that follow.

What is claimed is:

1. An integrated circuit (IC), comprising:
    matrix operand registers configured to store block matrices, wherein the block matrices are submatrices of two operand matrices;
    an arithmetic circuit comprising circuitry coupled, at an input, to the first memory matrix operand registers, wherein the arithmetic circuit is configured to perform a matrix multiplication of the two operand matrices by performing outer products using the block matrices;
    accumulator registers coupled to an output of the arithmetic circuit, the accumulator registers are configured to store partial matrices resulting from performing outer products and a final matrix resulting from summing the partial matrices;
    a L1 operand cache, wherein the matrix operand registers are coupled between the L1 operand cache and the arithmetic circuit; and
    a L1 accumulator cache, wherein the accumulator registers are disposed between the arithmetic circuit and the L1 accumulator cache.

2. The IC of claim 1, wherein the arithmetic circuit comprises:
    a matrix multiplier to perform the matrix multiplication; and
    an adder circuit coupled between the matrix multiplier and the accumulator registers, wherein the adder circuit is configured to perform an affine transformation.

3. The IC of claim 1, wherein performing outer products comprises multiplying each block matrix in a row of one of the two operand matrices with each block matrix in a column of the other of the two operand matrices to generate a first partial matrix of the partial matrices.

4. The IC of claim 3, wherein one of (i) each block matrix in the row is read only once from the matrix operand registers but is used in multiple multiplication operations when generating the first partial matrix or (ii) each block matrix in the column is read only once from the matrix operand registers but is used in multiple multiplication operations when generating the first partial matrix.

5. The IC of claim 1, wherein the L1 operand cache does not ever incur a cache miss when providing data to the arithmetic circuit.

6. The IC of claim 5, wherein the first memory L1 operand cache, the arithmetic circuit, and the L1 accumulator cache are part of a processing engine, wherein the processing engine does not include any cache control circuitry for evicting and filing the L1 operand cache, wherein a cache read-write sequence corresponding to the L1 operand cache is guaranteed a 100 percent hit rate.

7. The IC of claim 1, wherein the matrix operand registers only read from the L1 operand cache while the accumulator registers both read from and write to the L1 accumulator cache.

8. The IC of claim 1, further comprising:
    a plurality of processing tiles, each processing tile comprises a plurality of processing engines, wherein inputs of the plurality of processing engines are coupled to a same input interconnection network and outputs of the plurality of processing engines are coupled to a same output interconnection network,
    wherein each of the plurality of processing engines comprises the L1 operand cache, the matrix operand registers, the arithmetic circuit, the accumulator registers, and the L1 accumulator cache.

9. The IC of claim 8, further comprising:
    a plurality of L2 caches, each coupled to the same input interconnection network and the same output interconnection network in a respective processing tile of the plurality of processing tiles.

10. An integrated circuit (IC), comprising:
    matrix operand registers configured to store portions of two operand matrices;
    an arithmetic circuit comprising circuitry coupled, at an input, to the matrix operand registers, wherein the arithmetic circuit is configured to perform a matrix multiplication of the two operand matrices by performing outer products using the portions of the two operand matrices;
    accumulator registers coupled to an output of the arithmetic circuit, the accumulator registers are configured to store partial matrices resulting from performing outer products and a final matrix resulting from summing the partial matrices;
    a L1 operand cache, wherein the matrix operand registers are coupled between the L1 operand cache and the arithmetic circuit; and
    a L1 accumulator cache, wherein the accumulator registers are disposed between the arithmetic circuit and the L1 accumulator cache.

11. The IC of claim 10, wherein the portions of the two operand matrices are scalar values.

12. The IC of claim 10, wherein the portions of the two operand matrices are block matrices that are submatrices of the two operand matrices.

13. The IC of claim 10, wherein the arithmetic circuit comprises:
    a matrix multiplier to perform the matrix multiplication; and
    an adder circuit coupled between the matrix multiplier and the accumulator registers, wherein the adder circuit is configured to perform an affine transformation by summing the final matrix with another matrix stored in the accumulator registers.

14. The IC of claim 10, wherein performing outer products comprises multiplying one of a block matrix or a scalar value in a row of one of the two operand matrices with each block matrix or scalar value in a column of the other of the two operand matrices to generate a first partial matrix of the partial matrices.

15. The IC of claim 14, wherein one of (i) each block matrix or scalar value in the row is read only once from the matrix operand registers but is used in multiple multiplication operations when generating the first partial matrix or (ii) each block matrix or scalar value in the column is read only once from the matrix operand registers but is used in multiple multiplication operations when generating the first partial matrix.

16. The IC of claim 10, wherein the L1 operand cache does not ever incur a cache miss when providing data to the arithmetic circuit.

17. A method, comprising:
- loading, from a L1 operand cache, at least portions of two matrices into matrix operand registers to perform matrix multiplication;
- computing outer products of the two matrices using an arithmetic circuit to generate a plurality of partial matrices;
- storing the plurality of partial matrices in a second memory accumulator registers and a L1 accumulator cache; and
- summing the partial matrices to generate a final matrix.

18. The method of claim 17, further comprising:
- summing the final matrix with another matrix previously stored in the accumulator registers to perform an affine transformation.

19. The method of claim 17, wherein computing outer products comprises multiplying each block matrix in a row of one of the two matrices with each block matrix in a column of the other of the two matrices to generate a first partial matrix of the plurality of partial matrices.

\* \* \* \* \*